United States Patent [19]

Stad

[11] 4,008,516

[45] Feb. 22, 1977

[54] PROTECTIVE SYSTEM FOR EVACUATING DRUMS

[75] Inventor: Andrew N. Stad, Stamford, Conn.

[73] Assignee: Baldwin-Gegenheimer Corporation, Stamford, Conn.

[22] Filed: Oct. 24, 1972

[21] Appl. No.: 299,866

[52] U.S. Cl. .................................... 29/428; 222/1; 222/319; 101/1

[51] Int. Cl.[2] ........................................ G01F 11/00

[58] Field of Search ............ 29/428, 235, 450, 234; 222/1, 319; 101/1

[56] References Cited

UNITED STATES PATENTS

| | | | |
|---|---|---|---|
| 1,079,848 | 11/1913 | Ellingwood | 222/319 |
| 1,648,436 | 11/1927 | Allen | 29/235 |

*Primary Examiner*—C.W. Lanham

*Assistant Examiner*—Daniel C. Crane

*Attorney, Agent, or Firm*—Morgan, Finnegan, Pine, Foley & Lee

[57] ABSTRACT

A method of removing ink from an ink drum wherein the plunger remains substantially uncontaminated which comprises positioning an open ended plastic sleeve over the drum of ink, gathering the edges of one end of the sleeve together, inserting the gathered edges of the sleeve through an aperture in a collar having a diameter substantially equal to the inside diameter of the drum, positioning that portion of the sleeve that has been inserted through the collar about the container again and whereby when a plunger is lowered into engagement with the sleeve ink is forced into the pump tube.

3 Claims, 8 Drawing Figures

PROTECTIVE SYSTEM FOR EVACUATING DRUMS

GENERAL DESCRIPTION OF PRIOR PRACTICES

This invention relates to a method of removing ink from a container or ink drum in a manner whereby the plunger or piston used to force the ink from the container remains substantially free from ink contamination.

In the printing industry, it is frequently necessary to remove the ink from containers or drums as large as 55 gallons in order to provide ink for the ink fountain of an offset press or other type of press.

Accordingly, usually the ink is removed by removing the top of the container, lowering a plunger to which is assembled an ink pump, thereby forcing the ink upwardly into the inlet of the pump. This procedure is not entirely satisfactory for several reasons.

The ink container cans do not have diameters which are uniform from can to can. Thus, the diameter may vary by as much as a quarter of an inch or more. Therefore, the plunger may not fit as well within one ink container as it does for the next ink container. Therefore, it is possible that the piston will have a relatively tight fit for one container and a relatively loose fit for the next container. Where there is a loose fit, ink can leak through the space between the walls of the container and the piston severely contaminating the piston and wasting valuable ink. Equally important, such prior art methods result in complete contamination of the plunger by the ink because the entire plunger is in contact with the ink. Then contamination becomes progressively objectionable since much time must be expended in cleaning the ink from the sides and the top of the plunger and without periodic cleaning the buildup of ink on the top of the plunger will become excessive. The cleaning task becomes substantially easier if only a relatively small portion of the plunger becomes contaminated, and it is extremely desirable to eliminate ink wastage.

GENERAL DESCRIPTION

In accordance with the present invention, a method or procedure is provided whereby it is insured that virtually all of the ink within the ink drum is discharged and substantially all of the plunger is protected from contamination from the ink.

The method or procedure of the present invention utilizes a conventional plunger for discharging the ink from the ink drum in combination with a plastic sleeve and a collar resulting in a novel method and procedure for removing ink from an ink drum. The invention is utilized in conjunction with a conventional plunger which cooperates with an ink pump whereby when the plunger is moved downwardly, the ink is discharged upwardly through a conduit. Such a contraction is conventional and well known to those skilled in the art.

Briefly described, the present invention uses an open ended sleeve and a doughnut shaped collar member which is arranged in combination with the plunger so that ink can be discharged from an ink container without substantially contaminating the plunger. As embodied, the sleeve is arranged with respect to the container, the collar and the plunger so that ink cannot get between the sides of the ink container and the plunger and only a small portion of the plunger actually contacts the ink.

OBJECTS

In view of the foregoing, it is an object of this invention to provide a new and improved procedure or method for removing ink from an ink drum whereby ink wastage is substantially eliminated.

Another object of this invention is to provide a new and improved method or procedure for removing ink from an ink drum which ensures that virtually all ink is removed from the drum and the plunger remains substantially uncontaminated.

Other objects and advantages of the invention will be obvious or may be learned by practice of the invention, the same being realized and attained by means of the instrumentalities and combinations particularly pointed out in the appended claims.

The invention consists in the novel steps, constructions, arrangements, combinations and improvements herein shown and described.

The accompanying drawings referred to and constituting a part hereof, illustrate an embodiment of the invention and together with the description serve to explain the principle of the invention.

Figure 1:
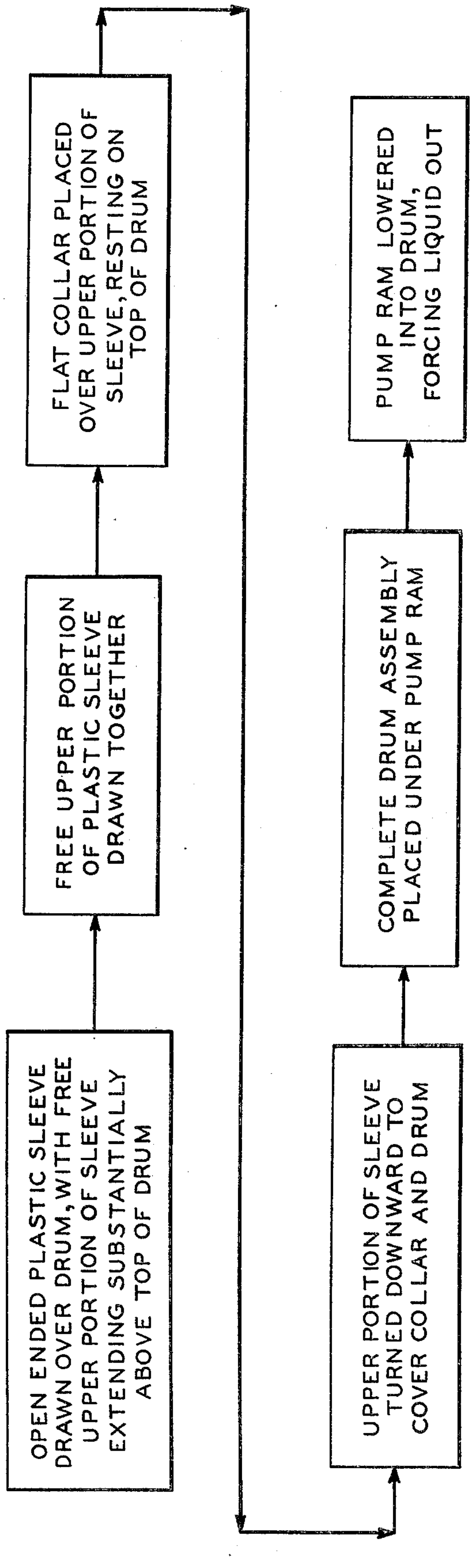
FIG. 1 is a flow chart setting forth the steps to be followed in the practice of the invention.

Referring to FIG. 1, there is shown therein an ink drum 2 which may be but does not necessarily, contain 55 gallons of printing ink. These drums have generally the same dimension but vary somewhat according to the manufacturer of the drums.

Figure 2:
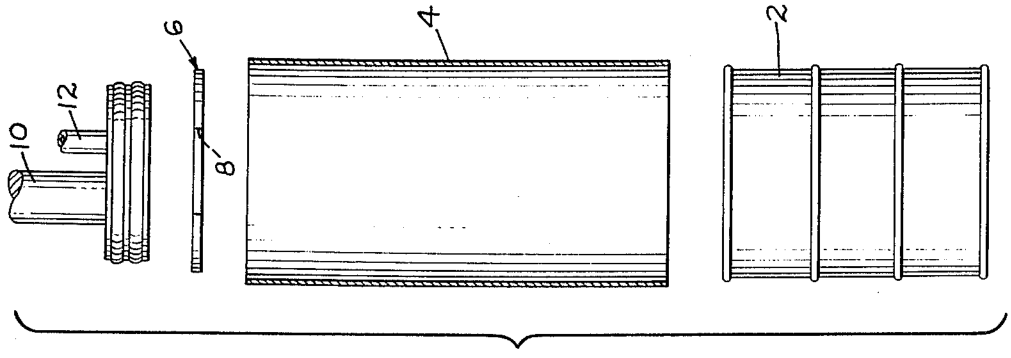
FIG. 2 is an exploded view showing the various elements used in the practice of the invention.

In accordance with this invention, there is provided an open ended sleeve 4. This sleeve is made of a suitable flexible plastic film-like material and has a diameter which is sufficient to permit it to be easily drawn or placed over the ink drum as shown in FIG. 2 and/or FIG. 3. The length of the sleeve is such that it is sufficiently longer than the drum so that the free end of the sleeve can be gathered together and drawn through the collar and then turned back over itself and again drawn over the ink drum.

In accordance with this invention, a collar 6 is provided which may be made of a cardboard or other sufficiently stiff material to withstand the pressures involved. The collar 6 has a diameter slightly less than the standard inside diameter of the ink drum. The collar 6 also includes an aperture 8 of a size sufficient to permit the sleeve to be drawn through it.

The plunger is protected against contamination by the following procedural steps utilizing the sleeve and drum.

Figure 3:
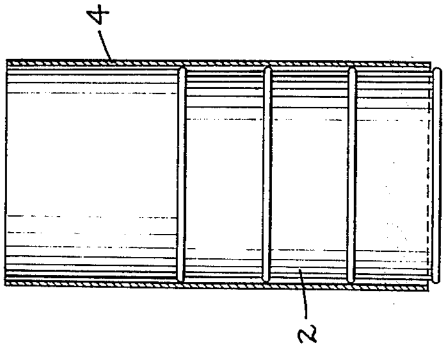
FIG. 3 is a sectional view showing the sleeve placed over the ink drum.
Figure 4:
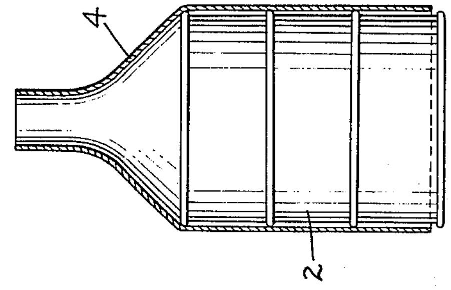
FIG. 4 is a sectional view showing the free end of the sleeve gathered together.
Figure 5:
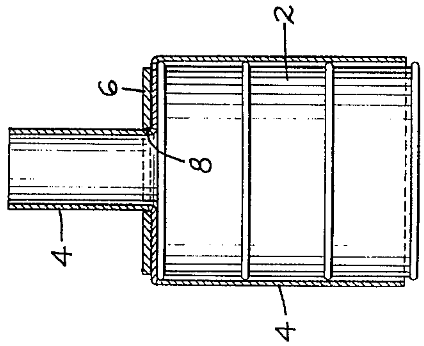
FIG. 5 is a sectional view showing the collar with the gathered ends of the sleeve in an aperture of the sleeve.
Figure 6:
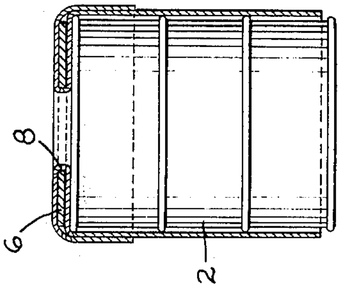
FIG. 6 is a sectional view showing the free end of the sleeve again placed over the drum.
Figure 7:
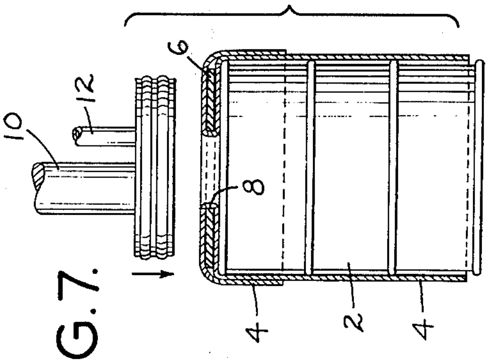
FIG. 7 is a sectional view showing the plunger immediately before ink discharge begins.
Figure 8:
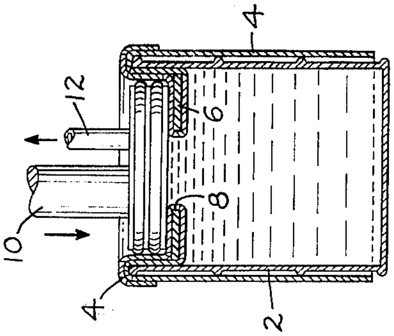
FIG. 8 is a sectional view showing the plunger within the container and discharging.

With the ink drum 2 in the vertical position, the open ended sleeve 4 is drawn over the drum so that the entire drum, except the bottom, is surrounded by the sleeve (see FIG. 3). It will be noted that the length of the sleeve is substantially longer than the length of the ink drum. Thereafter, the free end of the sleeve at the top of the drum is drawn together (FIG. 4) by hand. After the free end of the sleeve has been drawn together, that end of the sleeve is placed through the aperture 8 of the collar 6 (FIG. 5). The collar is placed in alignment with the top of the ink drum. The sleeve 2 is then positioned or drawn around the drum again thus covering the top of the collar (see FIG. 6). The sleeve, when placed or drawn about the ink drum, will extend approximately one third the way down the drum as can be seen in FIGS. 6 and 7. The plunger 10 is then lowered by any convenient means to contact that portion of the sleeve covering the collar. As the plunger descends, the sleeve and collar move down the inside of the drum thus keeping the plunger clean (FIG. 8). The plunger, it will be appreciated, is conventional in nature and has a passageway or pump tube 12 which permits the ink to be forced out of the top of the drum as the plunger descends. The collar and sleeve in this arrangement are in close engagement with the sides of the drum and they serve as a seal which prevents ink from passing between the side of the drum and the plunger, thus preventing the sides and top of the plunger from becoming contaminated with ink.

The invention, in its broader aspect, is not limited to the specific steps and procedures shown and described but departures can be made therefrom within the scope of the accompanying claims without departing from the principles of the invention and without sacrificing its chief advantages.

What is claimed is:

1. A method of removing ink from an ink drum whereby the plunger which forces the ink from the drum remains substantially uncontaminated comprising:

placing an open ended flexible sleeve which is substantially longer than the drum into telescoping relationship with said drum, gathering the free end of the sleeve and inserting the gathered free end of the sleeve through an aperture in a rigid collar having an aperture therein and an outside diameter substantially equal to the inside diameter of the ink drum, locating the rigid collar at the open end of said drum, positioning that portion of the sleeve which has been passed through the aperture in said collar over the drum so that when the plunger descends to force the ink from the drum the plunger remains substantially uncontaminated.

2. A method of removing ink from an ink drum by use of a plunger which descends into an ink drum whereby the plunger remains substantially uncontaminated from ink comprising:

placing an open ended flexible sleeve in telescoping relationship with said drum, gathering the free end of said sleeve and inserting said free end through a collar having an aperture therein and an outside diameter substantially equal to the inside diameter of said drum, locating said collar adjacent the open end of said ink drum, reversing the direction of the free end of said sleeve which has been passed through the aperture in said collar and directing that portion of said sleeve that has been passed through the aperture in said collar over the drum so that when the plunger descends to force the ink from the drum the plunger remains substantially uncontaminated.

3. The process as described in claim 2, wherein the sleeve when drawn about the drum after passing through the aperture extends approximately one-third down the drum.

* * * * *